(12) United States Patent
Rudelic

(10) Patent No.: US 7,117,306 B2
(45) Date of Patent: Oct. 3, 2006

(54) MITIGATING ACCESS PENALTY OF A SEMICONDUCTOR NONVOLATILE MEMORY

(75) Inventor: John C. Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 10/324,445

(22) Filed: Dec. 19, 2002

(65) Prior Publication Data
US 2004/0123033 A1    Jun. 24, 2004

(51) Int. Cl.
G06F 12/00 (2006.01)
(52) U.S. Cl. .................. 711/118; 711/103; 711/113
(58) Field of Classification Search ............... 711/133, 711/134, 136, 103, 118
See application file for complete search history.

(56) References Cited

U.S. PATENT DOCUMENTS

| | | | |
|---|---|---|---|
| 4,916,605 A * | 4/1990 | Beardsley et al. ........... 711/162 |
| 5,634,109 A * | 5/1997 | Chen et al. ................. 711/143 |
| 5,696,929 A * | 12/1997 | Hasbun et al. .............. 711/103 |
| 5,907,860 A * | 5/1999 | Garibay et al. ............. 711/117 |
| 6,058,456 A | 5/2000 | Arimilli et al. ............. 711/118 |
| 6,078,520 A * | 6/2000 | Tobita et al. ........... 365/185.09 |
| 6,112,280 A | 8/2000 | Shah et al. ................. 711/129 |
| 6,148,367 A * | 11/2000 | Tsuboi et al. ............... 711/113 |
| 6,182,194 B1 | 1/2001 | Uemura et al. ............. 711/133 |
| 6,209,072 B1* | 3/2001 | MacWilliams et al. ..... 711/167 |
| 6,219,773 B1* | 4/2001 | Garibay et al. ............ 711/201 |
| 6,336,161 B1* | 1/2002 | Watts ......................... 711/103 |
| 6,523,102 B1* | 2/2003 | Dye et al. ................... 711/170 |
| 6,622,210 B1* | 9/2003 | Hori ........................... 711/125 |
| 6,678,793 B1* | 1/2004 | Doyle ........................ 711/133 |
| 6,678,794 B1* | 1/2004 | Talyansky et al. ......... 711/135 |
| 6,704,835 B1* | 3/2004 | Garner ....................... 711/103 |
| 6,816,891 B1* | 11/2004 | Vahalia et al. ............. 709/214 |
| 6,832,300 B1* | 12/2004 | Naffziger et al. .......... 711/169 |
| 6,836,816 B1* | 12/2004 | Kendall ......................... 711/3 |

* cited by examiner

*Primary Examiner*—T Nguyen
(74) *Attorney, Agent, or Firm*—Trop, Pruner & Hu, P.C.

(57) ABSTRACT

Adding a nonvolatile storage (e.g., a cache) to an associated memory array within a semiconductor nonvolatile memory may mitigate the access penalty that occurs in semiconductor nonvolatile memories, such as flash memories and flash devices. For example, in response to a memory access request, the cache may be accessed for data before accessing the memory array and the data may be selectively stored from the memory array into the cache. In another embodiment, an asynchronous access to a semiconductor nonvolatile memory may be converted into a synchronous access.

34 Claims, 8 Drawing Sheets

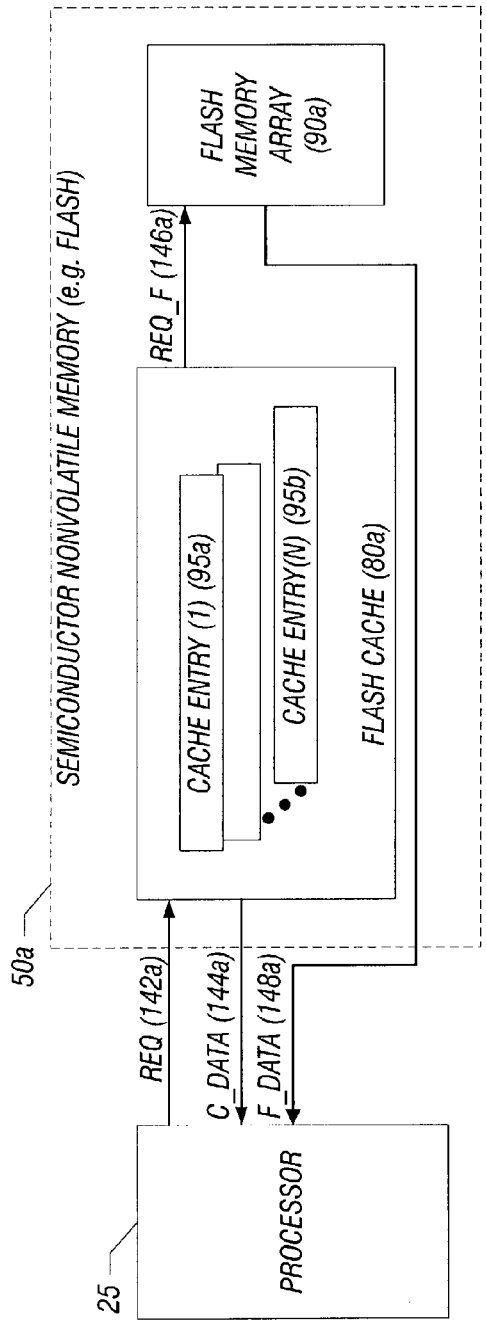
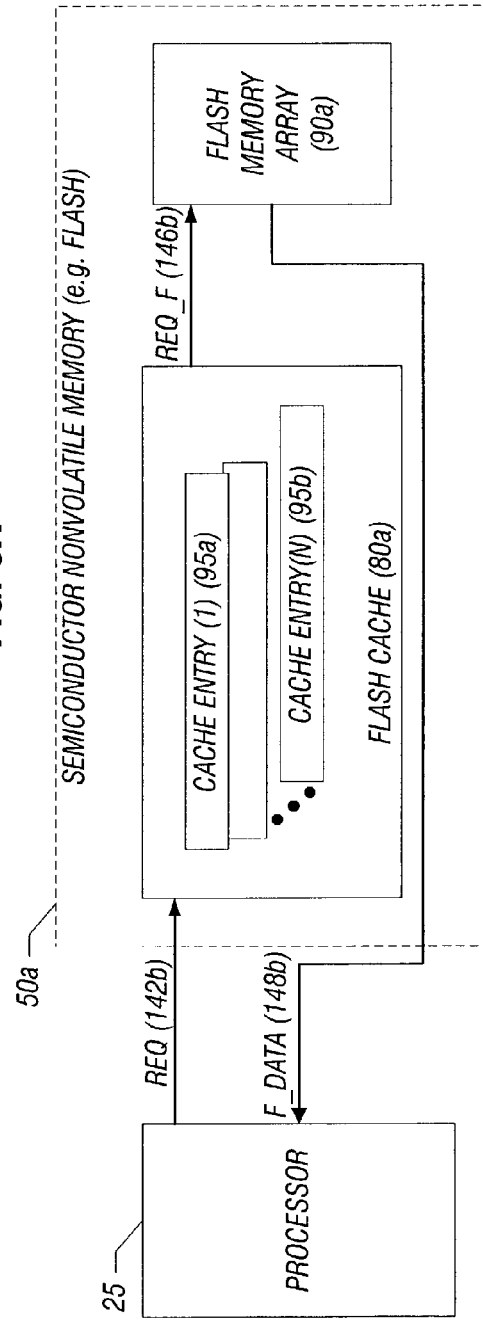
FIG. 3A
FIG. 3B

MITIGATING ACCESS PENALTY OF A SEMICONDUCTOR NONVOLATILE MEMORY

BACKGROUND

Embodiments of the invention relates generally to semiconductor nonvolatile memories, and more specifically to mitigating penalty associated with memory access.

A variety of processor-based devices including consumer devices that may be used in portable environments or otherwise, may include a semiconductor nonvolatile memory for erasably and programmably storing information. One common type of such a semiconductor nonvolatile memory is a FLASH memory or device. To operate a consumer device, generally many resident applications require a mix of code and data to be stored in such a non-volatile random access memory (NVRAM) (e.g., flash memory). For instance, wireless devices including cellular phones may utilize a flash memory that is capable of storing different forms of data associated with resident applications. Likewise, a portable device, e.g., a personal digital assistant (PDA) may incorporate a flash memory to store, among other things, certain operating system files and configurable data. Responsive to a read or a write request, access may be provided to code and/or data resident at a semiconductor nonvolatile memory (e.g., in the flash memories set forth above in connection with two exemplary processor-based devices).

However, most of the semiconductor nonvolatile memories including the flash memories have a relatively long initial access time. This long initial access time due to memory latency often prohibitively limits the maximum performance that may be obtained from many processor-based devices or systems in which the semiconductor nonvolatile memories are typically deployed.

Thus, there is a continuing need for better ways to devise semiconductor nonvolatile memories, particularly from a memory access penalty perspective.

BRIEF DESCRIPTION OF THE DRAWINGS

FIG. 3A is a schematic depiction of a system read resulting in a cache hit at the processor-based device shown in FIG. 1 in accordance with one embodiment of the present invention;

FIG. 3B is a schematic depiction of a system read resulting in a cache miss at the processor-based device shown in the FIG. 1 according to an embodiment of the present invention;

DETAILED DESCRIPTION

Figure 1:
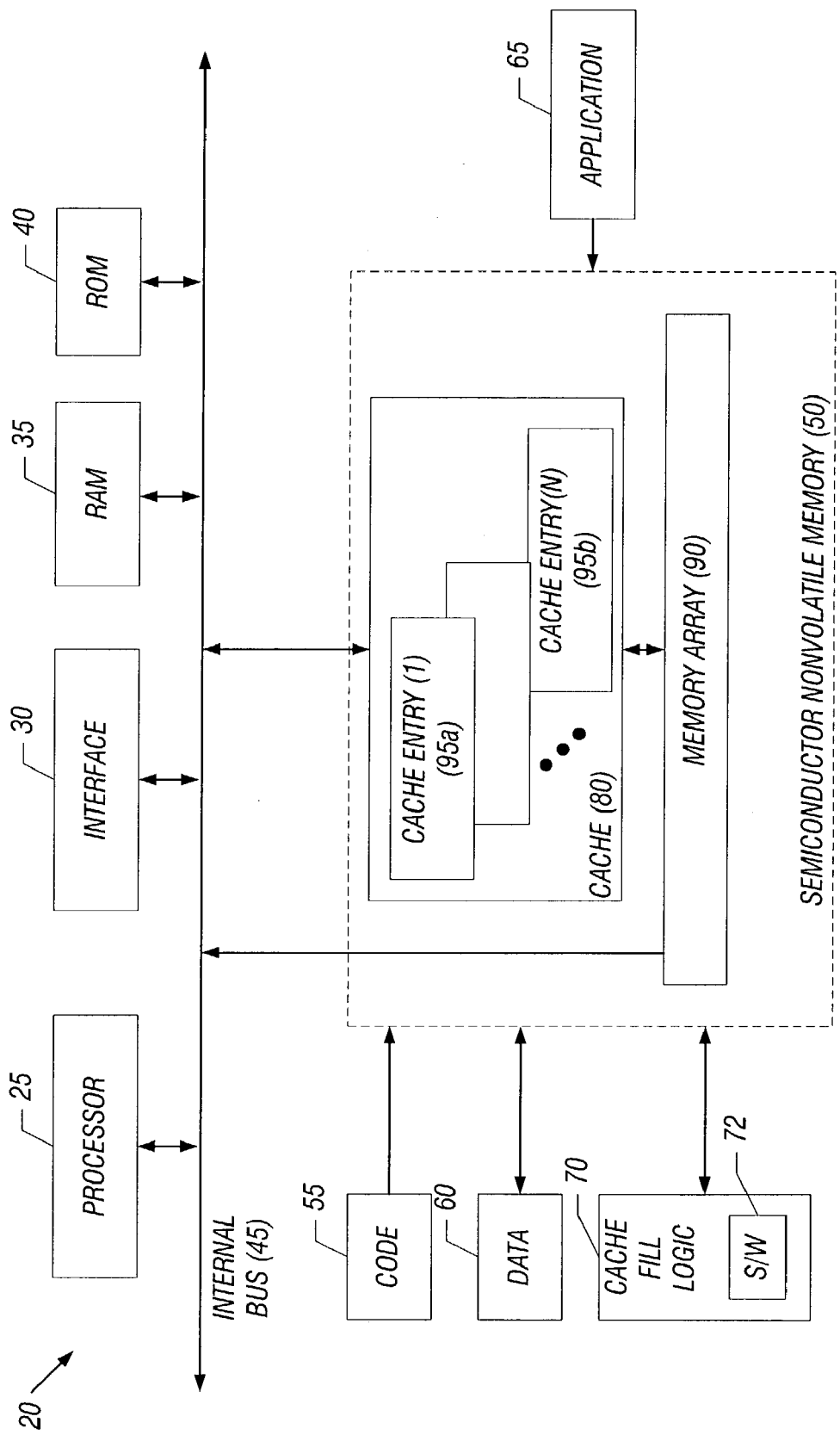
FIG. 1 is a schematic depiction of a processor-based device consistent with one embodiment of the present invention.

A processor-based device 20 shown in FIG. 1 may include a processor 25 coupled to an interface 30 according to some embodiments of the present invention for providing a read and/or a write access. Within the processor-based device 20, a semiconductor nonvolatile memory 50 may be coupled to a random access memory (RAM) 35 and a read only memory (ROM) 40 by an internal bus 45. Using code 55 and data 60, the processor 25 may enable storage and retrieval of memory data depending upon an access request to the semiconductor nonvolatile memory 50 in accordance with an embodiment. For example, a user may electrically program and erase information from the semiconductor nonvolatile memory 50. An application 65, such as an execute-in-place (XiP) application may be loaded into the semiconductor nonvolatile memory 50 in addition to cache fill logic 70 incorporating software (S/W) 72 consistent with some examples of the present invention. Although depicted as software 72 in FIG. 1, those skilled in the art would appreciate that the cache fill logic 70 may be implemented as hardware, firmware, or any combination of hardware, software and firmware.

According to multiple embodiments of the present invention, a nonvolatile storage, such as a cache 80 and an associated memory array 90 may be provided within the semiconductor nonvolatile memory 50. The cache 80 may comprise one or more cache entries 95*a* through 95*b*, storing data obtained from the memory array 90. For selectively populating the cache 80 located within the semiconductor nonvolatile memory 50, the cache fill logic 70 in conjunction with the associated software 72 may be used in accordance with many embodiments of the present invention.

By accessing the cache 80 before accessing the memory array 90, in response to a memory access request (e.g., read) and selectively storing the data from the memory array 90 into the cache 80 based, at least in part, on the memory access request, the penalty associated with a relatively long initial access time of the semiconductor nonvolatile memory 50 may be significantly mitigated. Specifically, when the requested data already resides at an address location, e.g., in the cache entry 95*a* of the cache 80, the time to access that data may be greatly reduced without incurring an undesired initial memory access penalty.

One example of memory access that may result in a relatively long initial access time is an asynchronous access to the semiconductor nonvolatile memory 50. While an asynchronous memory access may be non-coincident with a system clock (i.e., the memory access does not coincide with a clock edge), a synchronous memory access may be coincident with the system clock. Another asynchronous memory access may be performed in a non-clocked system. However, an asynchronous memory access typically involves multiple serial memory accesses of the semiconductor nonvolatile memory 50.

Examples of the semiconductor nonvolatile memory 50 include a flash device or a flash memory each capable of storing the code 55, the data 60, the application 65, and the cache fill logic 70. Of course, other suitable memories may be deployed in different embodiments of the present invention without deviating from the spirit and scope of the present invention. For example, any type of erasable, programmable memory that can be conventionally and electrically arranged or programmed may be used. Although not so limited, according to one particular embodiment of the present invention, the semiconductor nonvolatile memory 50 may be a static or a dynamic random access memory (SDRAM or SRAM). In this example, the data may be copied from a flash memory (or other static memory media) such as a disk space incorporating appropriate instructions therein for use with the application 65.

For some embodiments of the present invention in which a flash memory is deployed as the semiconductor nonvolatile memory 50, by electrically programming and/or erasing information therefrom, memory data may be read and/or written to and from the processor-based device 20. In addition, if the processor 25 utilizes a processor cache, then the cache 80 may be appropriately sized to match the processor cache size. However, different cache 80 implementations may comprise different cache line sizes for the cache entries 95a through 95b. In some specific cases, the cache line size of the cache 80 may be improved relative to the size of the processor cache associated with the processor 25.

Within the semiconductor nonvolatile memory 50, for example, data readable responsive to a memory access request may be stored in one or more address locations of the memory array 90 or the cache 80. In accordance with many embodiments, the cache entries 95a through 95b may be capable of receiving cached data based, at least in part, on a read request while the memory array 90 may store data which may be cacheable or accessible by an asynchronous memory access of the semiconductor nonvolatile memory 50. To populate the cache 80, the cache fill logic 70 comprising the software 72 may incorporate one or more cache fill algorithms. Using the cache fill algorithms, cache 80 may be populated with cached data that mitigates the access penalty associated with a subsequent memory access request(s) or an asynchronous memory access(es), by way of two examples.

In operation, responsive to an asynchronous memory access of the semiconductor nonvolatile memory 50, data may be cached into the cache 80 from the memory array 90. However, the asynchronous memory access may be first converted into a synchronous memory access, especially when an address location storing the cached data is indicated to be available in the cache 80. To this end, access to the cache 80 may be monitored, e.g., by the processor 25. In response to such monitoring, at least one selected asynchronous memory access, such as the most common one may be determined based, at least in part, on the access penalty that may be incurred if the data is found not available in the cache 80.

Execution of an execute-in-place (XiP) application may be enabled using the cache 80 storing the cached data therein for some embodiments of the present invention. In particular, if the cached data is indicated to be available in the cache 80, the cached data may be directly returned from the cache 80 itself. Otherwise, when the cached data is not available in the cache 80, the requested data may be sourced from the memory array 90, using address location information which may be derived from a memory access request.

To mitigate the access penalty for the semiconductor nonvolatile memory 50, in numerous embodiments of the present invention, the cache 80 may be appropriately tuned based, at least in part, on a characteristic. One characteristic according to which the semiconductor nonvolatile memory 50 may be configured limits the use of the cache 80 for certain types of memory accesses that result in a relatively long initial access time relative to other memory accesses. Another characteristic of the cache 80 that may mitigate the initial access time calls for sizing the cache 80 in a manner that significantly reduces access penalty when accessing the semiconductor nonvolatile memory 50. Yet another characteristic of the cache 80 may involve matching the size of the cache 80 to the processor cache size available on the processor 25. Populating the cache 80 with the most common memory access requests, i.e., with the corresponding data associated with such requests may yet be another characteristic suitable for tuning the cache 80. Providing a range of address locations to be cached in the cache 80 may serve as another desired characteristic for the purposes of tuning the cache 80 in order to mitigate the initial access time penalty in other scenarios.

Figure 2A:
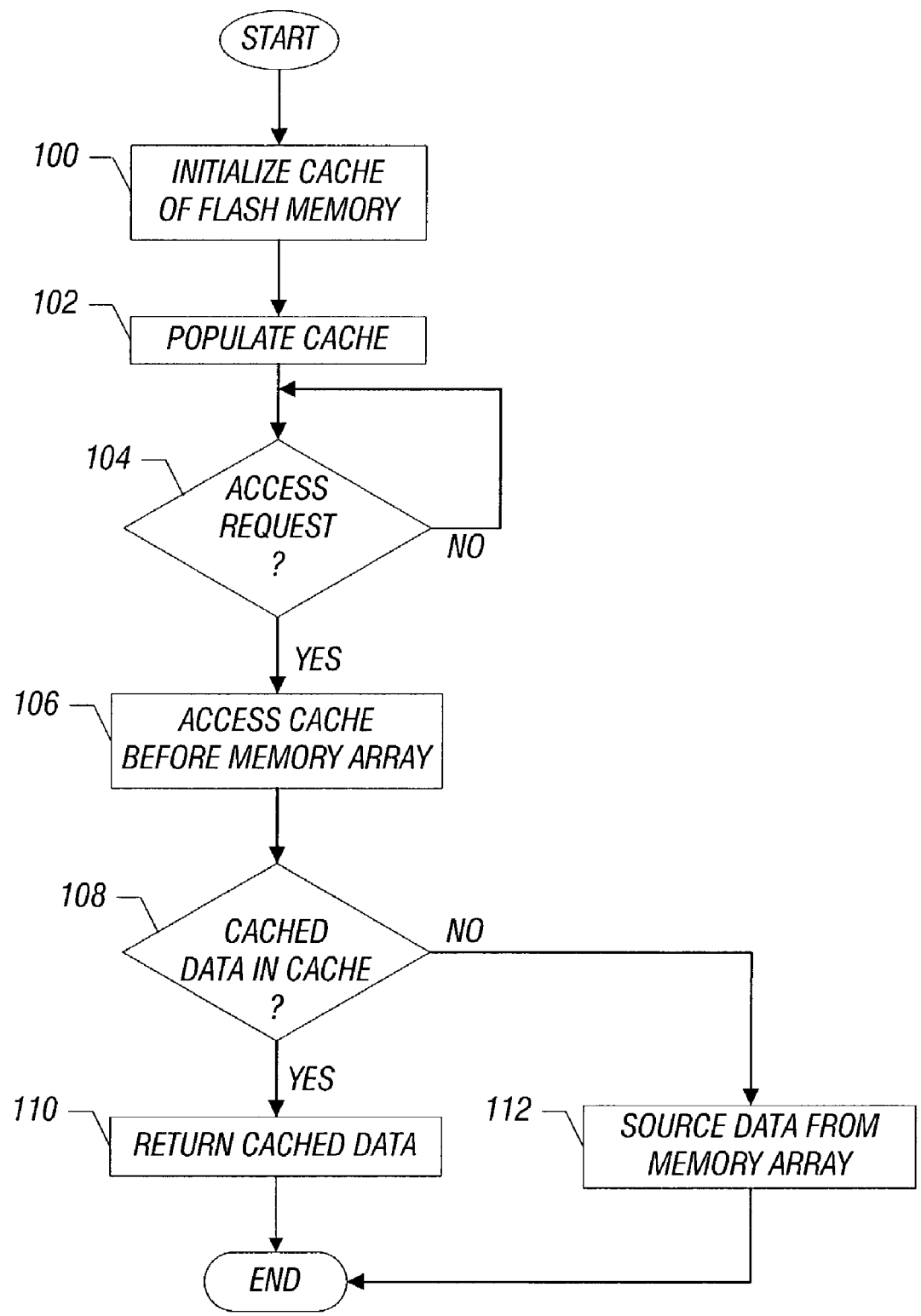
FIG. 2A is a flow chart for handling a memory access request at the semiconductor nonvolatile memory shown in FIG. 1 in accordance with one embodiment of the present invention.

Consistent with some embodiments of the present invention, the cache 80 tuned on one or more above indicated characteristics may be configured for handling memory access requests including asynchronous memory accesses or read requests as shown in FIG. 2A. At block 100, the cache 80 may be initialized at the semiconductor nonvolatile memory 50 which may be a flash device or a flash memory to mention two examples. Using one or more cache fill algorithms of the software 72, the cache fill logic 70 may populate the cache 80 at block 102 by selectively storing the data from the memory array 90 into the cache 80 based, at least in part, on a memory access request. A check at block 104 may determine whether or not an access request is received at the semiconductor nonvolatile memory 50. In response to the access request at the diamond 104, within the semiconductor nonvolatile memory 50, the cache 80 may be accessed before the memory array 90. Based, at least in part, on the access request, however, address location information may be derived therefrom in some cases.

Using the address location information, a check at diamond 108 may determine whether or not corresponding cached data is available in the cache 80. Availability of the cached data in the cache 80 may cause the semiconductor nonvolatile memory 50 to return the cached data directly from the cache 80 instead of getting it from the memory array 90 at block 110, substantially mitigating the access penalty of the semiconductor nonvolatile memory 50 in accordance with many examples of an embodiment of the present invention. Conversely, if the cached data is indicated to be unavailable at the cache 80, the requested data may be sourced from the memory array 90 as indicated at block 112 based, at least in part, on the address location information derived earlier from the access request.

According to some embodiments of the present invention, an asynchronous memory access may cause caching of the data from the memory array 90 to the cache 80, as illustrated above in the context of one of the characteristics that determine appropriate tuning of the cache 80, mitigating access penalties of the semiconductor nonvolatile memory 50. When an asynchronous memory access is indicated, the semiconductor nonvolatile memory 50 may automatically initiate the asynchronous access, returning in the cached data, if present in the cache 80, on the assumption that multiple serial memory accesses will be received. The cached data may be used until the asynchronous access to the semiconductor nonvolatile memory 50 has caught up with the demand of data, as a result of a particular memory access request without incurring the initial access time penalty.

For example, a flash device or a flash memory having an asynchronous access time of 85 nanoseconds and a synchronous access time of 15 nanoseconds may ideally cache five words. These cached five words may be returned as data while the flash device or memory is still operating on the asynchronous access. That is, the presence of an address location (e.g., a cache hit in the cache 80) may cause all subsequent asynchronous accesses to turn into a fast asynchronous access, by way of one example. As a result, the initial access time penalty may be significantly reduced. In this example, the initial access time penalty may be reduced by a factor of approximately six (85 nanoseconds/15 nanoseconds=5.6).

Figure 2B:
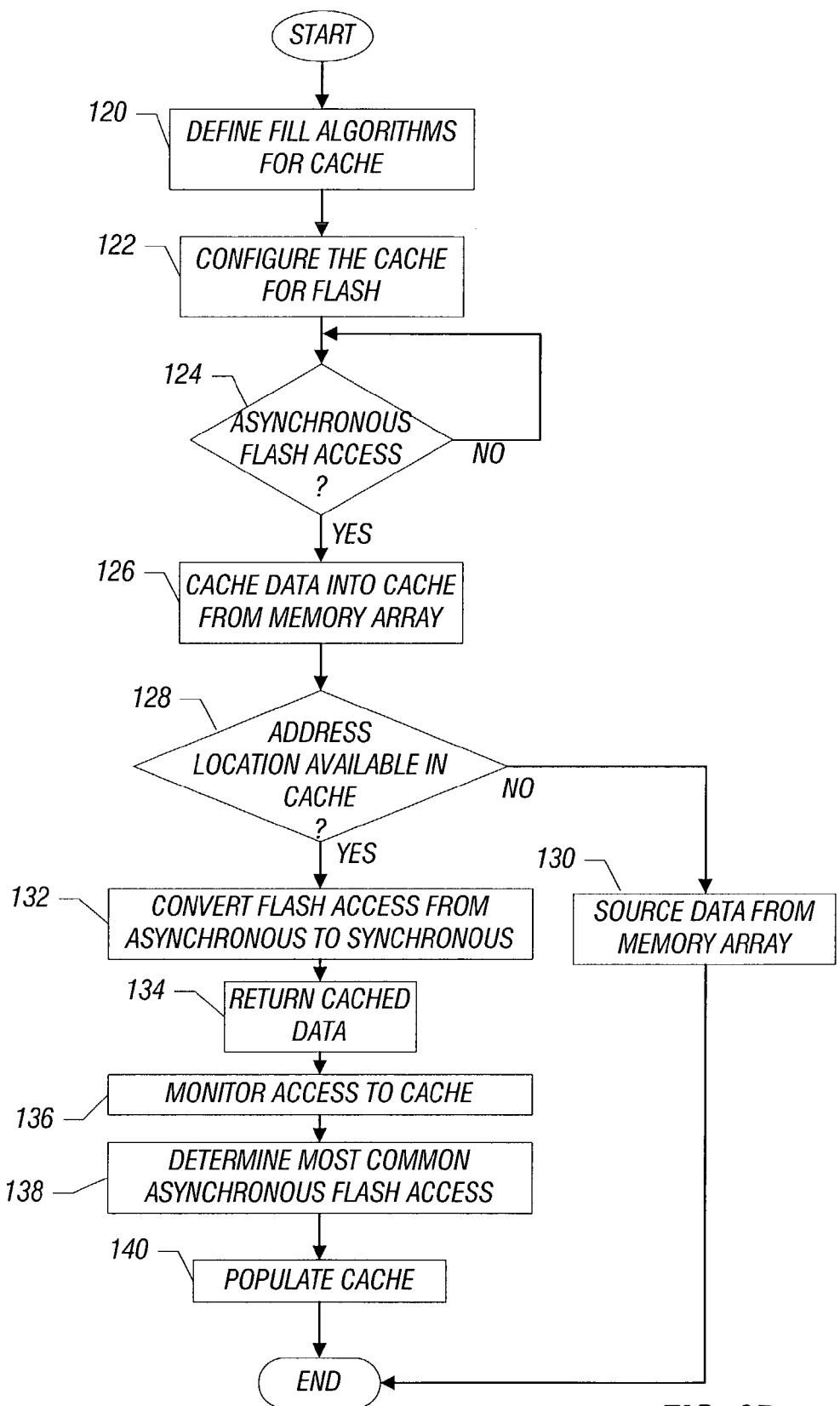
FIG. 2B is a flow chart for handling an asynchronous memory access at the semiconductor nonvolatile memory shown in FIG. 1 according to another embodiment of the present invention.

Referring to FIG. 2B, to handle asynchronous memory accesses, one or more cache fill algorithms may be defined at block 120 in order to populate the cache 80. For instance, the software 72 associated with the cache fill logic 70 (FIG. 1) may enable an appropriate defining of the cache fill algorithms. As indicated by block 122, the cache 80 may be configured according to one or more cache fill algorithms specified for the semiconductor nonvolatile memory 50.

Once configured at the block 122, a check at diamond 124 may indicate an asynchronous memory access of the semiconductor nonvolatile memory 50. Responsive to the asynchronous memory access that is in a non-coincident relationship with a system clock, data may be cached into the cache 80 from the memory array 90 at block 126. However, access to the semiconductor nonvolatile memory 50, i.e., an asynchronous memory access may be iteratively detected at the diamond 124.

Another check at diamond 128 may determine whether or not an address location is available in the cache 80, containing the requested data based, at least in part, on the asynchronous memory access. If the address location is unavailable in the cache 80 at the diamond 128, the requested data may be sourced from the memory array 90 at block 130, ending the flow in such cases.

However, when the address location is indicated to be available, then the asynchronous memory access may be converted into a synchronous memory access at block 132 for accessing data from the semiconductor nonvolatile memory 50, consistent with some embodiments of the present invention. Thereafter, the cached data from the cache 80 may be returned responsive to the synchronous memory access at block 134.

According to certain embodiments of the present invention, access to the cache 80 may be monitored, as indicated before in block 136. Based, at least in part, on the monitoring of the cache 80, at least one most common asynchronous memory access of the semiconductor nonvolatile memory 50 may be determined, in accordance with many examples of an embodiment at block 138. In some embodiments of the present invention, the most common asynchronous memory access refers to a memory access that does not coincide with a clock edge of a system clock but accesses to data at certain address locations based, at least in part, on the memory access occurs most frequently. Using the most common asynchronous memory access, in some cases, the cache 80 may be populated at block 140. In other examples, a count for the cache entries 95a through 95b may be maintained for the cache 80. In this manner, while populating the cache 80 based, at least in part, on asynchronous memory accesses, the address locations with a relatively high cache hit count may be retained, while the address locations with a relatively low cache hit counts may be made available for reuse.

Turning now to FIG. 3A, a schematic depiction of a system read involving a cache hit in response to a request (REQ) 142a from the processor 25 to a flash memory or device 50a is illustrated, in accordance with one embodiment of the present invention. Upon receipt of the request 142a at the flash memory or device 50a, it may be forwarded to a flash memory array 90a, as indicated by a request forward (REQ_F) 162a indication. If the requested data is indicated to be available at a flash cache 80a, then the cached data (C_DATA) 147 may be returned immediately from the flash cache 80a to the processor 25, in this example. Subsequent data, however, may be sourced from the flash memory array 90a, as indicated by a flash data (F_DATA) 148a indication.

Consistent with one embodiment of the present invention, a system read involving a cache miss is illustrated in FIG. 3B. In this embodiment, a request (REQ) 142b may be received at the flash memory or device 50a from the processor 25, requesting data therefrom. Since the data is not available in the flash cache 80a, in this case, the cache miss may result in the request for data being forwarded to the flash memory array 90a, as indicated by a request forward (REQ_F) 146b indication. Accordingly, the requested data may be sourced from the flash memory array 90a, as shown by a flash data (F_DATA) 148b indication.

Figure 4A:
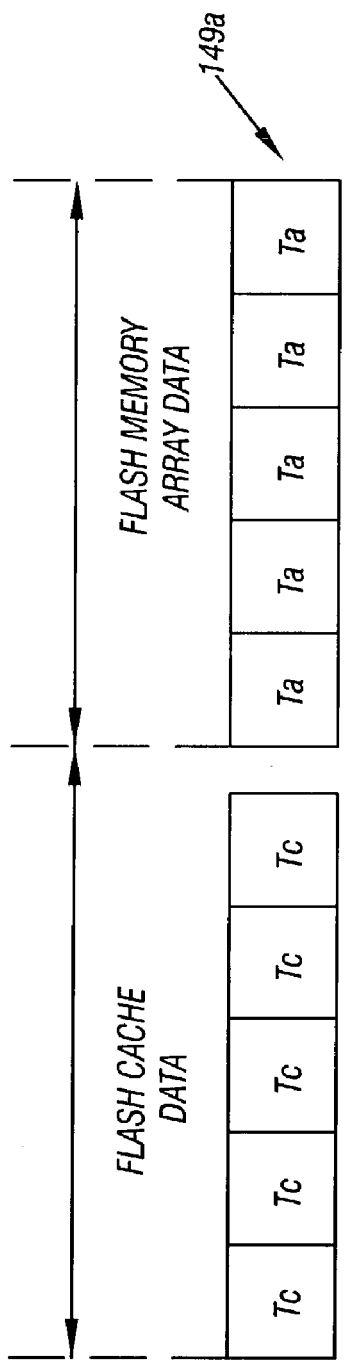
FIG. 4A is a hypothetical timing chart for the cache hit shown in FIG. 3A consistent with one embodiment of the present invention.
Figure 4B:
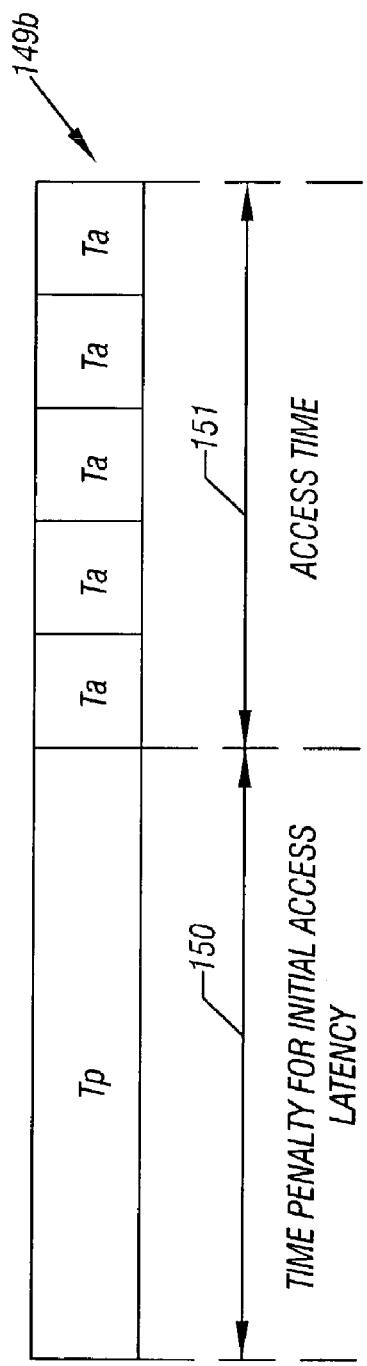
FIG. 4B is a hypothetical timing chart for the cache miss shown in FIG. 3B consistent with another embodiment of the present invention.

A timing chart associated with the cache miss illustrated in FIG. 3B is provided in FIG. 4B. Due to the cache miss, the requested data may be sourced from the flash memory array 90a instead of the flash cache 80a. In this situation, the operation incurs significant initial time access penalty due to memory latency, as shown by time $T_P$ 150 because an access time 151 in addition to the time penalty 150 will be used for the cache miss.

In contrast, a timing chart associated with the cache hit shown in FIG. 3A is illustrated in FIG. 4A consistent with few embodiments of the present invention. As can be seen from FIG. 4A, with the requested data present in the flash cache 80a, the time penalty $T_P$ 150 may be masked while the data is sourced from the flash cache 80a using cache access time $T_C$ for each of the cache entries 95a through 95b, even though subsequent data may be sourced from the flash memory array 90a. In this manner, the initial time access penalty due to the memory access latency involved in a data access operation from the flash memory or device 50a may be significantly reduced. Furthermore, the initial access time penalty associated with accessing the flash memory or device 50a may be substantially mitigated by intelligently populating the flash cache 80a in many situations.

Figures 5A, 5B:
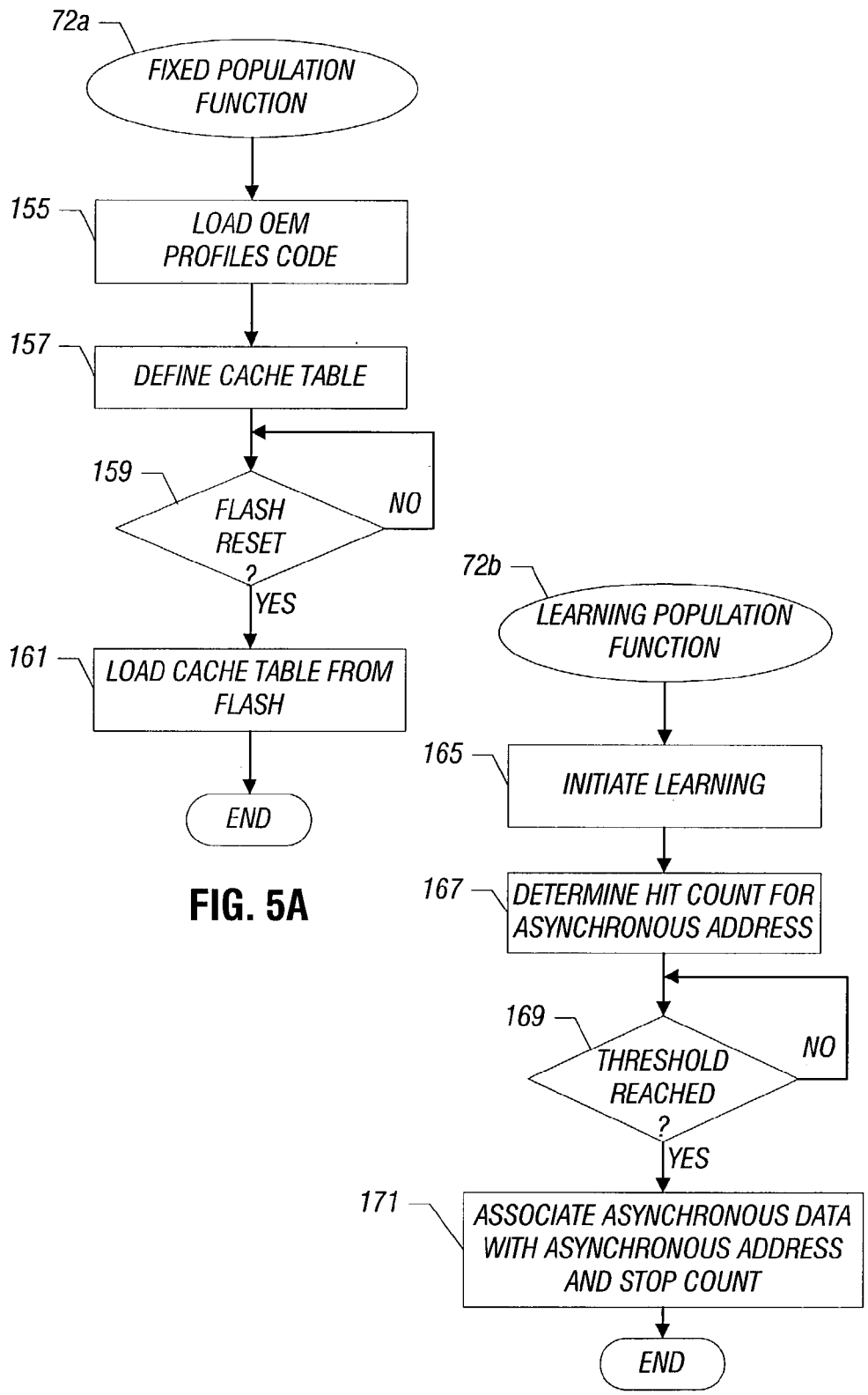
FIG. 5A shows a flow chart for a fixed population function of cache fill algorithms to intelligently populate the cache shown in FIG. 1 in accordance with many embodiments of the present invention.
FIG. 5B shows a flow chart for a learning population function of cache fill algorithms to intelligently populate the cache shown in FIG. 1 in accordance with many embodiments of the present invention.
Figures 5C, 5D:
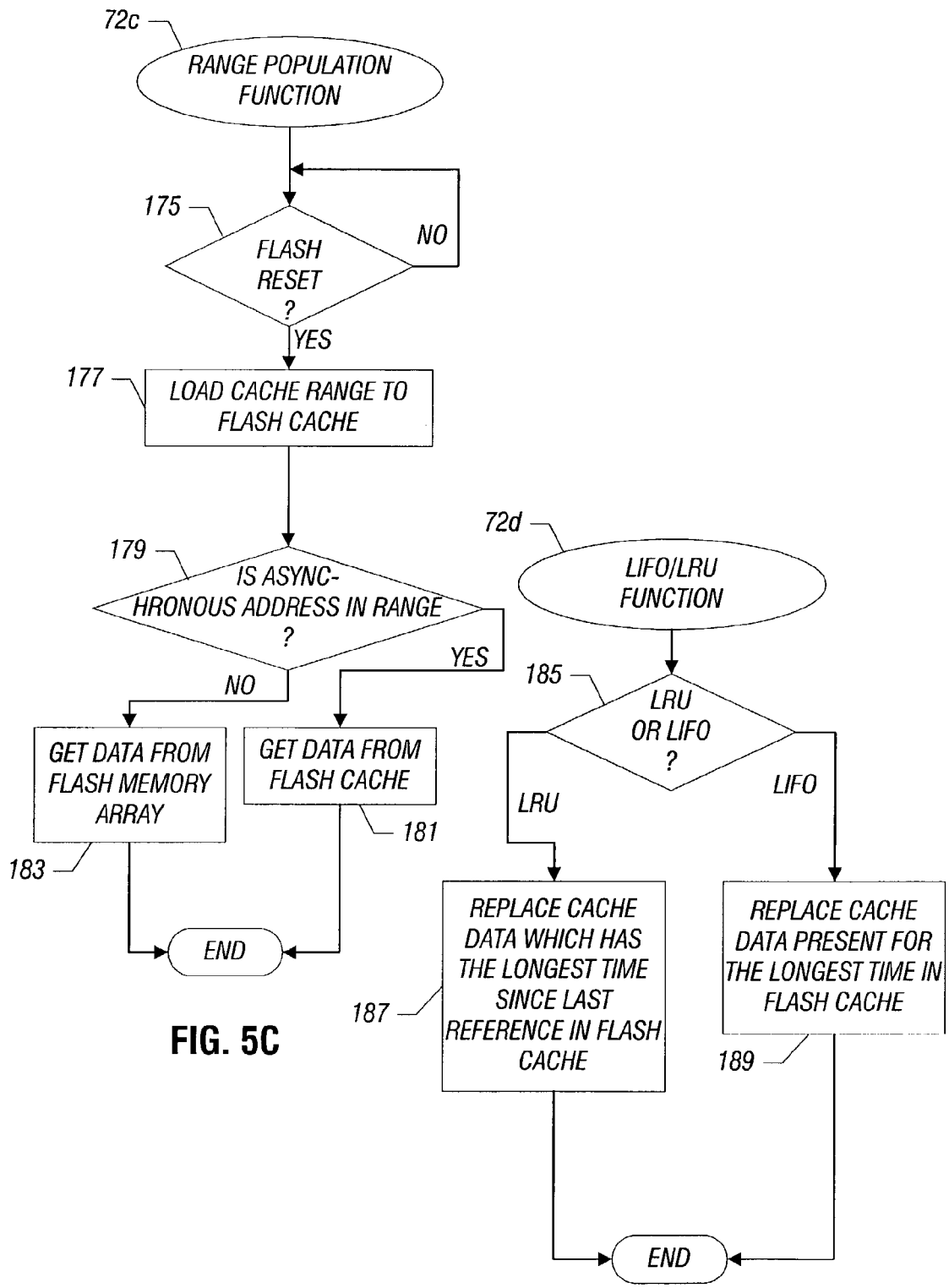
FIG. 5C shows a flow chart for a range population function of cache fill algorithms to intelligently populate the cache shown in FIG. 1 in accordance with many embodiments of the present invention.
FIG. 5D shows a flow chart for a LIFO/LRU population function of cache fill algorithms to intelligently populate the cache shown in FIG. 1 in accordance with many embodiments of the present invention.

To this end, FIGS. 5A through 5D show suitable cache fill algorithms, any one or more of which may be deployed for the purposes of populating the flash cache 80a (FIG. 4A and FIG. 4B) in accordance with many embodiments of the present invention. Examples of the cache fill algorithms include a fixed population function 72a (FIG. 5A), a learning population function 72b (FIG. 5B), a range population function 72*c* (FIG. 5C), and a last-in first-out (LIFO) or a least recently used (LRU) cache population function 72*d* (FIG. 5D).

Specifically, the fixed population algorithm 72*a* shown in FIG. 5A may use a predefined cache table that has been placed in the flash memory or device 50*a* for the purposes of populating the flash cache 80*a*. Depending upon a particular implementation, the predefined cache table may be developed based, at least in part, on flash code profiles obtained, e.g., from one or more original equipment manufacturers (OEM). At block 155, OEM code profiles may be loaded. As indicated in block 157, a cache table may be defined and execution of the OEM code may be used as a tool to determine the definition of the predefined cache table. Once defined, the cache table may be saved to the flash memory or device 50*a* and loaded therefrom, initializing the flash cache 80*a* upon a system initialization.

As one example, a flash reset may be detected in some cases by performing a check at diamond 159. When a flash reset is detected, a cache table may be loaded from the flash memory or device 50*a* at block 161. Otherwise, the fixed population function 72*a* may simply iterate, looking for a flash reset at the diamond 159, in accordance with a few examples of an embodiment.

Using the learning population function 72*b* shown in FIG. 5B, the flash cache 80*a* may be configured for learning. Involving at least two steps in many embodiments of the present invention, a first phase of the learning population algorithm 72*b* may cause storing of the address locations with respect to each of the asynchronous accesses along with the corresponding cache hit counts for the flash cache 80*a*. As shown at block 165, a learning process may be initiated by configuring the flash cache 80*a* for learning in accordance with some embodiments of the present invention. As more flash interactions occur, the cache hit counts for specific asynchronous accesses may be filtered up to the top of a list containing the cache hit counts with corresponding asynchronous access address locations.

Accordingly, the cache hit counts for address locations of each asynchronous access may be determined at block 167. Thereafter, when a fixed cache hit count threshold is reached, the flash cache 80*a* may stop counting the asynchronous accesses. In particular, a check at diamond 169 may indicate whether or not a threshold is reached. Upon reaching the threshold, training data from the asynchronous accesses may be associated with the address locations of the corresponding asynchronous accesses and the cache hit counting process may terminate at block 171, as one example. In this way, the flash cache 80*a* may be trained based, at least in part, on the training data and deployed for handling further asynchronous memory accesses.

Referring to FIG. 5C, a range population function 72*c* entails marking a range of address locations to be cached in accordance with a few embodiments of the present invention. In this case, the flash cache 80*a* may be assigned to a fixed address range. During data access, the defined access range may be preferred over the remaining address locations in the flash cache 80*a*. More particularly, a check at diamond 175 may ascertain whether or not a flash reset is encountered. If so, at block 177, the range of addresses may be loaded into the flash cache 80*a*. Another check at diamond 179 may determine whether an address location associated with an asynchronous access is within the range specified or located through the flash cache 80*a*. If acceptable range is indicated, the requested data may be obtained from the flash cache 80*a* at block 181. Conversely, if the range for addresses associated with the asynchronous access does not match with the marked range of addresses to be cached, then the requested data may be sourced instead from the flash memory array 90*a* at block 183.

Turning to FIG. 5D, a LIFO/LRU cache population function 72*d* may be utilized in some scenarios in which a dynamic population of the flash cache 80*a* is desirable. Based, at least in part, on the type of the cache population algorithm, appropriate populating of the flash cache 80*a* may be carried out in accordance with many embodiments of the present invention. In particular, a check at diamond 185 may show which one of the LRU or LIFO cache population algorithms is indicated to be selected to populate the flash cache 80*a*. For the LRU case, at block 187, replacement of the cached data may be undertaken based, at least in part, on a particular cached data which has the longest time since last reference was made thereto in the flash cache 80*a*. In the other case, when the LIFO is chosen, at the diamond 185, the cached data that is present for the longest time in the flash cache 80*a* may be replaced at block 189.

As a result, by advantageously configuring the flash cache 80*a* and/or by employing one or more of the cache fill algorithms for the cache fill logic 70 (FIG. 1), the initial time access penalty associated with the flash memory or device 50*a* may be significantly reduced. Likewise, by effectively converting a relatively long asynchronous access into a fast synchronous access, when the address location is indicated to be in the flash cache 80*a*, execution of an execute-in-place (XiP) application may be carried out in the flash memory or device 50*a*, such as in NOR flash devices, supporting a relatively higher execution performance than available without the provision of the flash cache 80*a* in such devices.

In other embodiments, use of the flash cache 80*a* may improve a system performance by minimizing or reducing bottlenecks involving memory access penalties based, at least in part, on latencies encountered while accessing data from semiconductor nonvolatile memory devices, including flash memory or flash devices. For example, by ideally utilizing the flash cache 80*a* to cache data for asynchronous accesses, the initial access time penalty may be significantly reduced for memory read operations.

According to some embodiments, by incorporating nonvolatile storage devices, such as a cache or a flash cache memory within the semiconductor nonvolatile memory 50, e.g., the flash cache 80*a* into the flash memory or device 50*a*, system read bandwidth/performance may be advantageously increased, because at least a portion of an initial access time penalty may be obviated. Accordingly, the semiconductor nonvolatile memory 50 or the flash memory or device 50*a* may be utilized in an XiP system, a memory subsystem, a multi-level cell memory, flash software, flash hardware because a relatively long initial access time which limits the upper end performance may be substantially reduced.

Figure 6:
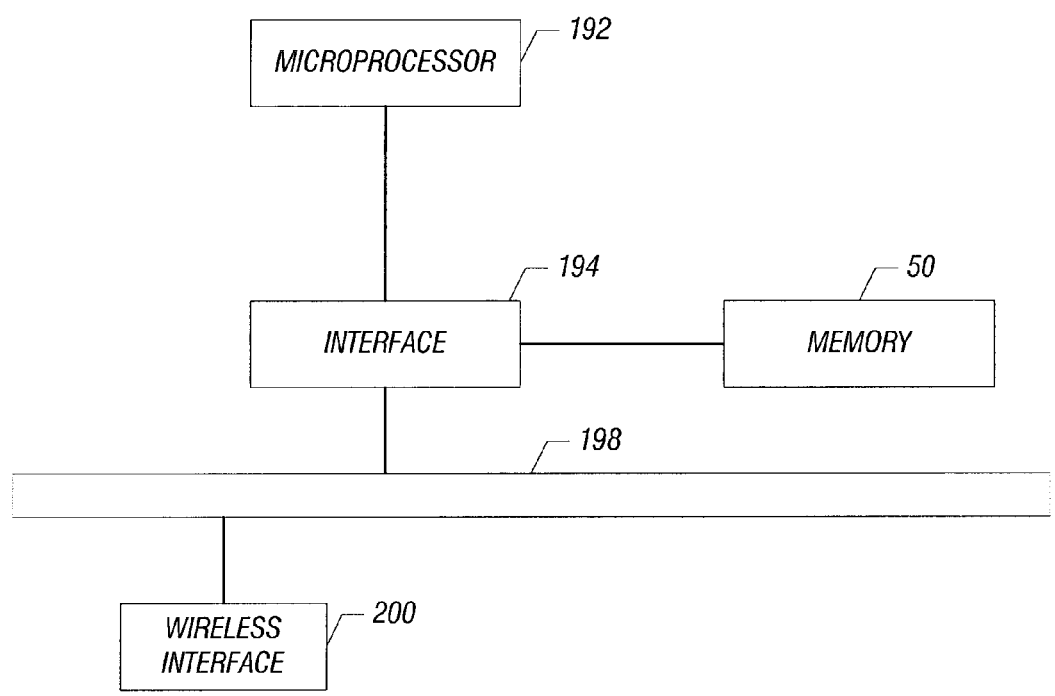
FIG. 6 shows a schematic depiction of a processor-based system consistent with one embodiment of the present invention.

Referring to FIG. 6, a processor-based system 190 may include a microprocessor 192 coupled to an interface 194. The microprocessor 192 may be a digital signal processor or a general purpose processor, to mention two examples. The interface 194 may be coupled to a bus 198. According to some embodiments of the present invention, the bus 198 may be coupled to a wireless interface 200. In this way, the processor-based system 190 may be a communications system, using the wireless interface 200. An example of the wireless interface 200 includes a transceiver incorporating an associated antenna for sending and receiving wireless data and information over a network. According to another example of the wireless interface 200, a device may be operably coupled thereto, exchanging network traffic on a bus.

Of course, other non-wireless systems may also be desirably implemented. The processor-based system 190 may include the semiconductor nonvolatile memory 50 which may be any one of memories illustrated in earlier Figures, including the semiconductor nonvolatile memory 50 of FIG. 1 and the flash memory or device 50a shown in FIGS. 3A and 3B.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    determining whether a memory access is asynchronous to a signal; and
    caching data for a semiconductor nonvolatile memory in a cache memory from an associated memory array based at least in part on whether a memory access is asynchronous.

2. The method of claim 1 comprising:
    accessing the cache memory separate from the associated memory array before accessing the memory array of said semiconductor nonvolatile memory in response to a memory access request; and
    selectively storing data from the memory array into the cache memory based, at least in part, on said memory access request.

3. The method of claim 2 comprising:
    deriving address location information from said memory access request; using said address location information to determine whether corresponding said data is available in the cache memory; and
    if said data is available in the cache memory, returning said corresponding cached data from the cache memory.

4. The method of claim 3 comprising:
    if said data is unavailable in the cache memory, sourcing data from the memory array based at least in part on said address location information.

5. The method of claim 1 comprising:
    defining for said semiconductor nonvolatile memory one or more algorithms to populate the cache memory with said data in a manner that mitigates access penalty associated with a subsequent memory access request.

6. A method comprising:
    using within a semiconductor nonvolatile memory a flash cache memory separate from an associated memory array to cache frequently accessed data;
    determining whether a memory access is asynchronous to a signal;
    in response to an asynchronous memory access, storing data into the cache memory returned from the memory array of said semiconductor nonvolatile memory;
    determining whether an address location storing said data is available in the cache memory; and
    if the address location is available, converting said asynchronous memory access into a synchronous memory access being coincident with the system clock.

7. The method of claim 6 comprising:
    monitoring access to the cache memory; and
    in response to said monitoring, determining at least one selected asynchronous memory access based, at least in part, on access penalty of said semiconductor nonvolatile memory.

8. The method of claim 7 comprising:
    defining for said semiconductor nonvolatile memory one or more fill algorithms; and
    using at least one of said one or more defined fill algorithms to selectively populate the cache memory with accessed data associated with said at least one most common asynchronous memory access.

9. The method of claim 8 comprising:
    providing a pre-defined table saved in said semiconductor nonvolatile memory for use with one of said one or more fill algorithms;
    providing a learning function for use with another one of said one or more fill algorithms;
    configuring the cache memory to populate based, at least in part, on the learning function;
    marking a range of address locations to be cached to assign the cache memory to a fixed address range; and
    providing at least one of a last-in first-out or a least recently used cache replacement function to dynamically populate the cache memory.

10. An apparatus comprising:
    a semiconductor nonvolatile memory including a cache memory separately accessible from an associated memory array to determine whether a memory array access is asynchronous to a signal and, if so, to store data at said semiconductor nonvolatile memory from the memory array into the cache memory.

11. The apparatus of claim 10, wherein said semiconductor nonvolatile memory in response to a memory access request from a logic device causing a selective storing of data from the memory array into the cache memory.

12. The apparatus of claim 10, wherein said semiconductor nonvolatile memory to store into one or more address locations data readable responsive to said memory access request and the cache memory to include said data cached to execute an execute-in-place application.

13. The apparatus of claim 10, said semiconductor nonvolatile memory is a flash memory, the cache memory is a flash cache and the memory array is a flash memory array.

14. The apparatus of claim 13, further comprising:
    logic including one or more cache fill algorithms that populate the cache memory with accessed data in a manner that mitigates access penalty associated with a subsequent memory access request.

15. A semiconductor nonvolatile memory comprising:
    a cache including one or more cache entries to receive data based, at least in part, on whether a read request is asynchronous.

16. The semiconductor nonvolatile memory of claim 15 further comprising:
    a memory array coupled to the cache to store said data that is accessible at said semiconductor nonvolatile memory by an asynchronous access; and
    logic to implement one or more cache fill algorithms to populate the cache with said data in a manner that mitigates access penalty associated with another read request subsequent to said read request.

17. The semiconductor nonvolatile memory of claim 16, wherein said logic to convert said asynchronous access into a synchronous access when an address location storing said data is available in the cache.

18. The semiconductor nonvolatile memory of claim 15, the cache including data to enable execution of an execute-in-place application.

19. The semiconductor nonvolatile memory of claim 15, said semiconductor nonvolatile memory is a flash memory, the cache is a flash cache and the memory array is a flash memory array.

20. A processor-based system comprising:
a processor; and
a flash device operably couplable to said processor, said flash device including a cache memory separately accessible from an associated flash memory array at said semiconductor nonvolatile memory depending on whether a memory read request is asynchronous to a signal and, if so, causing a selective storing of data from the memory array into the cache memory.

21. The processor-based system of claim 20, said processor-based system is an execute-in-place system.

22. The processor-based system of claim 20, said flash device includes a cache fill logic including one or more fill algorithms to populate the cache memory with said data in a manner that mitigates initial access time penalty associated with a subsequent memory read request.

23. The processor-based system of claim 20, the cache memory further comprising one or more cache entries capable of receiving said data based, at least in part, on said memory read request, and the flash memory array coupled to the cache memory to store data that is accessible at said flash device upon an asynchronous access.

24. The processor-based system of claim 23, wherein said cache fill logic to convert said asynchronous access into a synchronous access when an address location storing said data is available in the cache memory.

25. An article comprising a medium storing instructions that, when executed by a processor-based system result in:
determining whether a memory access is asynchronous to a signal: and
caching data for a semiconductor nonvolatile memory in a cache memory from an associated memory array depending on whether a memory access is asynchronous.

26. The article of claim 25, comprising a medium storing instructions that, when executed by a processor-based system result in:
accessing the cache memory separate from the associated memory array before accessing the memory array of said semiconductor nonvolatile memory in response to a memory access request;
selectively storing data from the memory array into the cache memory based, at least in part, on said memory access request;
deriving address location information from said memory access request;
using said address location information to determine whether corresponding said data is available in the cache memory; and
if said data is available in the cache memory, returning said corresponding cached data from the cache memory.

27. The article of claim 26, comprising a medium storing instructions that, when executed by a processor-based system result in:
if said data is unavailable in the cache memory, sourcing data from the memory array based, at least in part, on said address location information.

28. The article of claim 25 comprising a medium storing instructions that, when executed by a processor-based system result in:
defining for said semiconductor nonvolatile memory one or more algorithms to populate the cache memory with said data in a manner that mitigates access penalty associated with a subsequent memory access request.

29. An article comprising a medium storing instructions that, when executed by a processor-based system result in:
using within a semiconductor nonvolatile memory a cache memory separate from an associated memory array to cache frequently accessed data;
determining whether a memory access is asynchronous to a signal;
in response to an asynchronous memory access, storing data into the cache memory returned from the memory array of said semiconductor nonvolatile memory;
determining whether an address location storing said data is available in the cache memory;
if the address location is available, converting said asynchronous memory access into a synchronous memory access being coincident with the system clock;
monitoring access to the cache memory; and
in response to said monitoring, determining at least one selected asynchronous memory access based, at least in part, on access penalty of said semiconductor nonvolatile memory.

30. The article of claim 29 comprising a medium storing instructions that, when executed by a processor-based system result in:
defining for said semiconductor nonvolatile memory one or more fill algorithms; and
using at least one of said one or more defined fill algorithms to selectively populate the cache memory with accessed data associated with said at least one most common asynchronous memory access.

31. The article of claim 30 comprising a medium storing instructions that, when executed by a processor-based system result in:
providing a pre-defined table saved in said semiconductor nonvolatile memory for use with one of said one or more fill algorithms;
providing a learning function for use with another one of said one or more fill algorithms;
configuring the cache memory to populate based, at least in part, on the learning function;
marking a range of address locations to be cached to assign the cache memory to a fixed address range; and
providing at least one of a last-in first-out or a least recently used cache replacement function to dynamically populate the cache memory.

32. A processor-based system comprising:
a digital signal processor;
a semiconductor nonvolatile memory coupled to said digital signal processor, said semiconductor nonvolatile memory including a cache memory separately accessible from an associated memory array at said semiconductor nonvolatile memory depending on whether a system read request is asynchronous to a signal and, if so, causing a selective storing of data from said memory array into the cache memory; and
a wireless interface coupled to said digital signal processor to enable wireless communications.

33. The processor-based system of claim 32, further comprising:

logic to implement one or more cache fill algorithms to populate the cache memory with said data in a manner that mitigates access penalty associated with a subsequent read request.

34. The processor-based system of claim 32 wherein said cache memory is a flash cache memory.

* * * * *